Sept. 7, 1948.                C. M. BROWN                 2,448,954
                           FISHING LINE SWIVEL
                           Filed Nov. 17, 1944
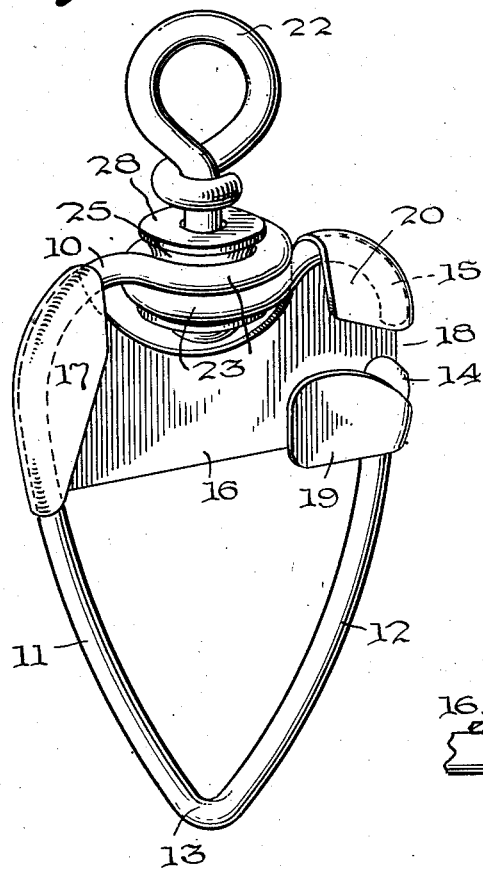
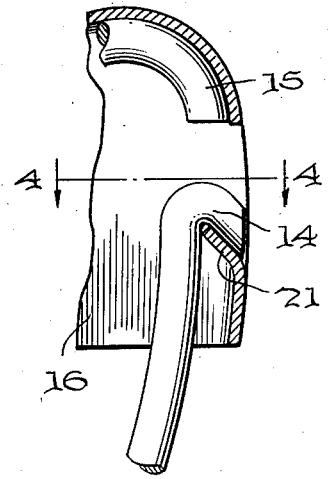
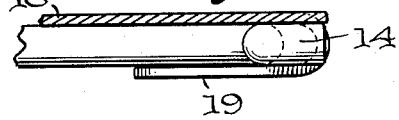
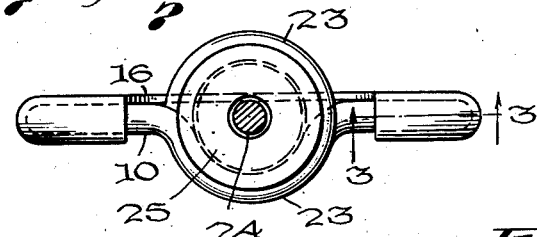
CHANNING M. BROWN
By Church & Church
His Attorneys Patented Sept. 7, 1948

2,448,954

UNITED STATES PATENT OFFICE 2,448,954

FISHING LINE SWIVEL

Channing M. Brown, El Paso, Tex.

Application November 17, 1944, Serial No. 563,924

6 Claims. (Cl. 43—28)

This invention relates to swivel devices of the type adapted for use on fishing lines.

One object of the present invention is to provide a swivel of the type indicated in which the eye-member to which the fishing line is attached has an exceedingly free swiveling action.

Another object of the invention is to provide a fishing line swivel formed of a single length of wire bent into a loop having an entrance at one side formed between the ends of the wire and a crossbar at one end in which there is an opening formed by coiling the wire upon itself, said opening being adapted to receive a rotatable sleeve in which the eye-member is swiveled.

A still further object of the invention is to provide a novel, simple and efficient arrangement for locking together the two otherwise free ends of the wire and closing the entrance opening formed by the spaced ends of the wire.

Another object is to provide locking means for the otherwise free ends of the wire which will permit ready release of one of said ends but which will, at the same time insure against accidental release of said end when strains are imposed on the loop longitudinally of the swivel.

With these and other objects in view, the invention consists in certain details of construction and combinations and arrangements of parts, all as will hereinafter be more fully described and the novel features thereof particularly pointed out in the appended claims.

In the accompanying drawing—

Figure 1 is a perspective view of a swivel constructed in accordance with the present invention;

Fig. 2 is a top plan view with the shank of the so-called eye-member shown in section;

Fig. 3 is a sectional view on the line 3—3 of Fig. 2;

Fig. 4 is a sectional view on the line 4—4 of Fig. 3; and

Fig. 5 is a sectional view taken longitudinally of the swivel connection between the eye-member and the wire loop.

The body of the present device is composed of a length of wire bent into an elongated loop preferably of substantially heart-shape formation, which may be described as comprising a comparatively wide or long end 10 which would normally be its upper end and from which the sides 11, 12 converge so that the loop tapers to a point 13 at its opposite or lower end. The ends 14, 15 of the wire are spaced apart to form an entrance to the loop, said entrance preferably being located in the upper portion of the sides 12 of the loop. This entrance is for the purpose of facilitating attachment of the desired fishing tackle in the loop but due to the resiliency of the wire means must be provided for normally closing this entrance and retaining the ends 14, 15 in their proper relative positions.

For this purpose a retainer plate 16 is disposed across the wider or upper end of the loop, with portions of its top edge and its end edges bent at least partially around the so-called upper end 10 and the sides 11, 12 of the loop. The end of the retainer plate bent over the side 11 of the loop and the adjacent upper edge of said plate bent over loop end 10 may merge into one another as shown at 17 but, at the opposite side of the loop, the plate is cut away to form a throat 18 in registry with the loop entrance formed between the ends of the wire. The bent over portions of the plate, indicated at 19 and 20, which form this throat embrace the ends 14, 15, respectively, of the wire and, in this fashion, the end 14 is normally held in its proper position relatively to end 15. In order to prevent accidental displacement of the end 14, especially when strains are imposed on the loop longitudinally thereof, said end is off-set outwardly and downwardly to form a hook or catch which engages over an edge portion of plate 16, as best illustrated in Fig. 3. Preferably that portion of the edge of plate 16 which is engaged by said hook or catch, is off-set inwardly as indicated at 21. This prevents the end of the wire protruding beyond the end of the plate and eliminates the possibility of the end being snagged or fouled. In addition, this off-set portion 21 facilitates releasing the end 14 when desired, this being accomplished by pressing the sides of the loop toward each other. However, notwithstanding the ease with which said end 14 can be intentionally disengaged, nevertheless it cannot be accidentally disengaged under tension imposed longitudinally of the loop because under these latter conditions the hook or catch will merely be forced into more intimate contact with said off-set portion 21.

The eye-member 22, to which the fishing line is normally attached is swiveled in an opening on the looped end 10. For this purpose, a portion of that section of the wire constituting said end 10 may be coiled upon itself at 23 to form said opening at a point midway the sides of the loop or substantially in alinement with the point 13 of the loop. Preferably, to permit maximum and free swiveling action, the eye-member is provided with a shank 24 which extends freely through a cylindrical sleeve 25 and said sleeve is freely rotatable in the opening formed by the coil 23. The end of eye-member shank 24 may be upset, as at 26, and the sleeve 25 may be formed with lateral projections, such as annular flanges 27, 28 at its ends to retain said sleeve in its opening in loop end 10 and to retain the eye-member in said sleeve.

As will be apparent, the present construction is comparatively inexpensive and consists of a minimum number of parts so assembled that there is little likelihood of the swivel being damaged while, at the same time, it is capable of efficient operation when in use. As stated, the opening formed by the coiled portion of loop end 10 is located medially of that end of the loop and the intermediate portion of the upper edge of plate 16 underlies, so to speak, the coiled portion 23 of the wire as shown in dotted lines in Fig. 2. Thus the plate cannot slip off the larger end of the loop. At the same time, said plate is held against slipping or accidental displacement in the opposite direction toward the pointed end of the loop by the interlocking engagement of the reversely bent upper edge portions of the plate which embrace the end 10 at opposite sides of the coil 23. Hence the plate is securely attached to the loop.

What I claim is:

1. In a fishing line swivel, an elongated loop of wire tapering from one end to the other with the extremities of the wire spaced apart to form an entry opening at one side of said loop, one extremity of the wire having a reverse bend disposed outwardly and toward the narrow end of the loop, a retainer plate having reversely bent edge portions engaged around said wire at the wide end of the loop and at the sides of said loop, including the extremities of said wire, said plate having an inwardly offset edge portion frictionally engaging in the reversely bent extremity of said wire, and an eye-member swiveled in the wider end of said loop.

2. In a fishing line swivel, a length of resilient wire in the form of an elongated loop with the sides of the loop converging from one end to the other end with the extremities of the wire spaced from each other to form an entry opening in one side of the loop, the wire forming the wider end of said loop having a coil therein constituting an opening in said wider end, an eye-member swiveled in said opening, and a retainer plate spanning said loop, said plate having reversely bent end portions embracing the opposite sides of said loop and reversely bent edge portions intermediate its ends embracing the wire forming said wider loop end at opposite sides of said coiled portion to prevent movement of the plate towards the opposite narrower end of the loop.

3. In a fishing line swivel, an elongated loop of wire with the extremities of the wire spaced apart to form an entrance opening in one side of the loop adjacent one end thereof, the wire forming said end of the loop having a coil therein forming a swivel receiving opening in said end of the loop, an eye-member swiveled in said swivel opening, and a locking plate spanning the loop and having reversely bent edge portions embracing said end of the loop at opposite sides of said coil to prevent movement of the plate toward the opposite end of the loop and said plate also having reversely bent end portions embracing the opposite sides of the loop including the extremities of said wire.

4. In a fishing line swivel, an elongated loop of resilient wire with an entrance opening formed between the extremities of the wire at one side of the loop adjacent one end thereof, a circular swivel opening in the wire constituting said end of the loop, and a plate having reversely bent edge portions partially embracing said loop end and the sides of the loop including the spaced extremities of the wire to retain said extremities in alinement, movement of said plate from said loop end to the opposite end of the loop being prevented by the engagement between said reversely bent portions of the plate and the first mentioned end of the loop.

5. In a fishing line swivel, an elongated loop of resilient wire, said loop having sides converging from one of its ends toward its opposite end with the extremities of the wire spaced apart at one side of the loop adjacent the wider end thereof to form an entrance opening in the wire at said side, the wire constituting the wider end of the loop having a coil therein forming a swivel opening, an eye-member swiveled in said opening, and a retainer plate extending across said loop adjacent said wider end, said plate having reversely bent end portions embracing the sides of the loop including the wire extremities, said plate also having one edge formed with reversely bent portions intermediate said plate ends embracing said wider end of the loop at opposite sides of the swivel opening to prevent movement of the plate from the wider end of the loop toward the narrower end, movement of said plate in the opposite direction being prevented by engagement of said edge of the plate with said coiled portion of the loop end, and that portion of the wire extending from the narrow end of the loop to said entrance opening having its extremity offset outwardly of the loop to form a catch with said catch normally engaging over an edge portion of said retainer plate.

6. In a fishing line swivel, a length of wire in the form of a loop having end portions of different width and side portions converging from the wider end to the opposite end with the ends of the wire spaced apart to form an entrance to said loop at the side and adjacent said wider end of the loop, that portion of the wire constituting the wider end having an open coil therein to form a circular opening in substantial alinement with the converging end of the loop, a cylindrical sleeve rotatable in said circular opening, means for limiting movement of the sleeve axially of said opening, an eye-member swiveled in said sleeve, and a plate extending across said loop, said plate spanning said entrance and having reversely bent edge portions engaged around said wider end of the loop at opposite sides of said coiled portion and around the sides of said loop.

CHANNING M. BROWN.

REFERENCES CITED

The following references are of record in the file of this patent:

UNITED STATES PATENTS

| Number | Name | Date |
|---|---|---|
| 184,627 | Jones | Nov. 21, 1876 |
| 333,648 | Lothrop | Jan. 5, 1886 |
| 612,576 | Smallwood | Oct. 18, 1898 |
| 1,182,471 | Frost | May 9, 1916 |
| 1,313,372 | Dodge | Aug. 19, 1919 |
| 2,033,701 | Gibbs | Mar. 10, 1936 |
| 2,214,668 | Erickson | Sept. 10, 1940 |
| 2,219,983 | Evenson | Oct. 29, 1940 |